(12) United States Patent
Luo et al.

(10) Patent No.: US 8,243,630 B2
(45) Date of Patent: Aug. 14, 2012

(54) APPLICATION-LEVEL ROUTING PROTOCOL FOR MULTIPARTY AUDIO-VIDEO CONFERENCING

(75) Inventors: Chong Luo, ShangHai (CN); Jiang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1445 days.

(21) Appl. No.: 11/253,362

(22) Filed: Oct. 19, 2005

(65) Prior Publication Data

US 2007/0086366 A1    Apr. 19, 2007

(51) Int. Cl.
*H04L 12/28* (2006.01)
*H04L 12/16* (2006.01)
*H04L 11/00* (2006.01)

(52) U.S. Cl. ........ 370/261; 370/259; 370/260; 370/262; 370/263; 370/352; 370/353; 370/354; 370/355; 370/356; 379/93.21; 379/158; 379/201.01; 379/202.01; 379/205.01; 709/204

(58) Field of Classification Search .................. 370/256, 370/398, 396, 352–356, 259–263; 379/67.1–88.28, 379/142.07, 112.05, 272–273, 219–242; 709/207
See application file for complete search history.

(56) References Cited

U.S. PATENT DOCUMENTS

| | | | | |
|---|---|---|---|---|
| 5,831,975 | A * | 11/1998 | Chen et al. | 370/256 |
| 6,247,072 | B1 * | 6/2001 | Firestone | 710/53 |
| 6,298,061 | B1 * | 10/2001 | Chin et al. | 370/400 |
| 6,418,139 | B1 * | 7/2002 | Akhtar | 370/356 |
| 7,171,491 | B1 * | 1/2007 | O'Toole et al. | 709/244 |
| 7,313,593 | B1 * | 12/2007 | Pulito et al. | 709/204 |
| 7,499,466 | B2 * | 3/2009 | Hundscheidt et al. | 370/432 |
| 2002/0065886 | A1 | 5/2002 | Kim et al. | |
| 2002/0080755 | A1 * | 6/2002 | Tasman et al. | 370/338 |
| 2002/0087711 | A1 * | 7/2002 | Leung | 709/233 |
| 2002/0099854 | A1 * | 7/2002 | Jorgensen | 709/249 |
| 2002/0126698 | A1 * | 9/2002 | Deshpande | 370/467 |
| 2002/0150099 | A1 * | 10/2002 | Pung et al. | 370/390 |
| 2003/0088696 | A1 * | 5/2003 | McCanne | 709/238 |
| 2003/0120917 | A1 * | 6/2003 | Itonaga et al. | 713/163 |
| 2003/0149724 | A1 * | 8/2003 | Chang | 709/204 |
| 2004/0003040 | A1 * | 1/2004 | Beavers et al. | 709/204 |
| 2004/0010616 | A1 * | 1/2004 | McCanne | 709/238 |

(Continued)

OTHER PUBLICATIONS

Optimizing QoS Aware Ethernet Spanning Trees Tibor Cinkler, Istv'an Moldov'an, Andr'as Kern, Csaba Lukovszki, Gyula Sallai Department of Telecommunications and Media Informatics Budapest University of Technology and Economics Aug. 2005 (c)2005 IEEE.*

(Continued)

*Primary Examiner* — Asad Nawaz
*Assistant Examiner* — Wutchung Chu
(74) *Attorney, Agent, or Firm* — Lee & Hayes, PLLC

(57) ABSTRACT

Systems and methods are described for implementing an application-level routing protocol for multiparty audio-video conferencing. In one implementation, application-level per-stream routing techniques separately control audio data and video data between conference members hosted on a network. Different audio application-level multicast (ALM) trees are generated by each member, are dynamically updated according to shortest-path-first selection of data delivery paths, and are used to send audio data to the other members of the videoconference. Likewise, different video ALM trees are generated by each member, are dynamically updated according to broadest-path-first selection of data delivery paths, and are used to send video data to the other members of the videoconference. Separate audio and video ALM trees for each member can utilize IP multicast in segments of the network in which IP multicast is enabled.

17 Claims, 5 Drawing Sheets

U.S. PATENT DOCUMENTS

| | | | |
|---|---|---|---|
| 2004/0030804 A1* | 2/2004 | Wiget et al. | 709/245 |
| 2004/0071100 A1* | 4/2004 | Klaghofer | 370/261 |
| 2004/0179470 A1* | 9/2004 | Nguyen et al. | 370/216 |
| 2004/0181800 A1* | 9/2004 | Rakib et al. | 725/25 |
| 2004/0205215 A1* | 10/2004 | Kouvelas et al. | 709/231 |
| 2005/0086469 A1* | 4/2005 | Dunagan et al. | 713/163 |
| 2005/0195774 A1* | 9/2005 | Chennikara et al. | 370/338 |
| 2006/0059253 A1* | 3/2006 | Goodman et al. | 709/223 |

OTHER PUBLICATIONS

Applicant Admitted Prior Art—Mimura, et al., "A Middleware Approach for Supporting Application-level Multicast Services", Autonomous Decentralized system (ISADS), 2005, pp. 689-694.*

Strowes (peer-to-Peer Audio Conferencing, Department of Computing Science University of Glasgow, 2004).*

Luo, Chong; Li, Jiang; and Li, Shipeng; "DigiMetro—An Application-Level Multicast system for mulit-party video conferncing" Microsoft research asia; IEEE communication Society Globecom 2004; Nov. 2004.*

Funabiki, et al., "Compact Tree Plus Algorithms for Application-Level Multicast Communications in Multihome Networks", IEEE, vol. 1, 2005, pp. 139-144.

Liu, et al., "Metrino—An Application-Level Multicast system for Real-Time Video Communication", Wireless Communications, Networking and Mobile Computing, vol. 2, 2005, pp. 1311-1316.

Mimura, et al., "A Middleware Approach for Supporting Application-Level Multicast Services", Autonomous Decentralized Systems (ISADS), 2005, pp. 689-694.

Notification of Transmittal of the International Search Report and The Written Opinion of the International Searching Authority, or the Declaration. Date of mailing Mar. 26, 2007. 10 pages.

The Extended European Search Report mailed Sep. 30, 2011 for European patent application No. 06826132.0, 7 pages.

Katrinis, et al., "11. Application-Layer Multicast", Jan. 1, 2005, Peer-to-Peer Systems and Applications Lecture Notes in Computer Science; LNCS, Springer, Berlin, DE, pp. 157-170.

* cited by examiner

APPLICATION-LEVEL ROUTING PROTOCOL FOR MULTIPARTY AUDIO-VIDEO CONFERENCING

BACKGROUND

Media transmission in a multiparty videoconference is characterized by multiple one-to-many semantics. One basic mechanism that provides this one-to-many data delivery is IP multicast. However, IP multicast relies on hardware to provide the multicast support. Spotty deployment of multicast-enabled routers has caused many multipoint communication applications to fail. Developers have since turned to "multiple unicast" to implement one-to-many communication. Multiple unicast, however, has some problems too. In contrast to IP multicast, which ensures only one packet on any physical link, multiple unicast replicates data at the source, making the "last mile" (the first mile in this usage) a severe bottleneck. Multiple unicast is also unable to limit throughput to accommodate the most incapable member in a multiparty videoconference, as connectivity on the Internet is heterogeneous, ranging from high speed T1 lines, cable modems, and ADSL, to slow-speed dial-up connections.

There has been a surge of application-level multicast (ALM) systems designed for various types of applications. However, different Internet applications have their distinct requirements for bandwidth, latency and scalability. Table 1 offers a comparison of four typical Internet applications. As shown in Table 1, videoconferencing has a lower scalability requirement than do the other three applications, but demands more bandwidth and is more latency sensitive. Therefore, ALM systems that work for the other applications listed in Table 1 are not directly applicable to videoconferencing applications.

TABLE 1

Characteristics of Internet Applications

| Application | Bandwidth | Latency | Scale |
|---|---|---|---|
| Internet content distribution | Middle | Low | Large |
| Peer-to-peer media streaming | High | Middle | Large |
| Low-bandwidth data streaming | Low | Low | Large |
| Multiparty videoconferencing | High | High | Small |

Four conventional ALM protocol designs represent the universe of conventional videoconferencing applications. First, "End System Multicast" provides a fully distributed protocol, named NARADA. NARADA adopts a mesh-first strategy in building multicast trees: end systems self-organize into a rich connected graph (mesh), on top of which data delivery trees are generated based on a distance vector protocol. The main disadvantage of NARADA is that it does not consider the effect of building multiple delivery trees over the same mesh. Since the only routing metric used in the distance vector protocol is end-to-end delay, NARADA does not have any control over the bandwidth usage of each link. As a result, short links can get congested easily when there are numerous participating members.

Differing from NARADA, ALMI is a centralized protocol. Each ALMI session has a session controller, which is responsible for member registration and multicast tree generation. ALMI takes multiple data sources into consideration, and uses a shared tree to handle routing. The shared tree is formed as a minimum spanning tree (MST) based on end-to-end measurements, i.e., round trip delays collected by session members. Although efficiency of the ALMI tree approaches the efficiency of IP multicast trees in terms of total tree cost, the end-to-end delivery delays of ALMI trees are much longer. Moreover, the network load of leaf nodes and inner nodes differs greatly when multiple data sources exist. Since ALMI does not control the bandwidth usage as NARADA does, the inner nodes can get overloaded as the conference size increases.

In contrast to NARADA and ALMI, the protocol used in "multi-sender 3D video conferencing" explicitly addresses multi-sender requirements in a videoconferencing application. This technique uses a double-algorithm approach for managing soft join requests (subscriptions to a stream). The key shortcoming of this protocol, as the authors point out, is its static nature with regard to network conditions. For example, it assumes that all the members of a videoconference have the same static bit rates for data streams.

DIGIMETRO builds multiple source-specific delivery trees in a fully distributed manner. DIGIMETRO considers the effect of having multiple data sources in the same session, and adopts a two-step process to achieve sub-optimal performance. The main advantage of DIGIMETRO over the previous work is that the multicast tree is constructed and refined under dynamically changing network parameters, and it allows different data sources to have different stream bit rates. A multiparty videoconferencing system DIGIPARTY has been implemented using DIGIMETRO.

There are several drawbacks of the existing ALM protocols on the real network. First, both DIGIMETRO and multi-sender 3D video-conferencing assume that the bandwidth bottleneck always occurs in the first mile, which is not true for local area network (LAN) users. Second, NARADA and ALMI only limit bandwidth usage by giving a rough fan-out range, they do not control how many times outbound links are used. Except for ALMI, the other three references described above build source-specific multicast trees to optimize delay performance under certain bandwidth constraints. They tend to aggressively use up local bandwidth resources, however, and have a strong tendency to become multiple unicast. None of the above-mentioned ALM protocols make use of IP multicast, which is usually available in LANs. What is needed is an ALM schema that is more specifically tailored to the needs of videoconferencing.

SUMMARY

Systems and methods are described for implementing an application-level routing protocol for multiparty audio-video conferencing. In one implementation, application-level per-stream routing techniques separately control audio data and video data between conference members hosted on a network. Different audio application-level multicast (ALM) trees are generated by each member, are dynamically updated according to shortest-path-first selection of data delivery paths, and are used to send audio data to the other members of the videoconference. Likewise, different video ALM trees are generated by each member, are dynamically updated according to broadest-path-first selection of data delivery paths, and are used to send video data to the other members of the videoconference. Separate audio and video ALM trees for each member can utilize IP multicast in segments of the network in which IP multicast is enabled.

This Summary is provided to introduce a selection of concepts in a simplified form that are further described below in the Detailed Description. This Summary is not intended to identify key features or essential features of the claimed sub-

DETAILED DESCRIPTION

Overview

Described herein are systems and methods that use an exemplary application-level multicast (ALM) protocol enabling efficient one-to-many data delivery for audio-video conferencing (hereinafter, "videoconferencing"). ALM pushes multicast related functionalities, such as routing and packet duplication, to the application layer, thereby working independently of underlying hardware. The exemplary ALM routing protocol described herein builds multiple source-specific trees to achieve better delay performance and to avoid bottlenecks at inner nodes. Differing from existing ALM protocols, which only optimize delay performance in multicast tree computation, the exemplary ALM routing protocol differentiates between delay-sensitive audio data and bandwidth-intensive video data, and also uses different optimization metrics in building respective multicast trees for audio and video.

In one implementation, the exemplary ALM routing protocol uses broadest-path-first (BPF) routing for video distribution, as it achieves better performance than shortest-path-first (SPF) routing in both network resource usage and load balancing. Even though IP multicast is only intermittently deployed across the Internet, the exemplary ALM routing protocol makes the best use of IP multicast when it is enabled on part of a network. The exemplary ALM routing protocol greatly reduces network resource usage while providing improved end-to-end delay performance.

Besides implementing the two features just introduced—using BPF routing for computing data delivery paths for bandwidth-intensive video data, and making use of IP multicast enabled networks when they are present—the exemplary ALM routing protocol also implements an exemplary per-stream routing control protocol.

Exemplary System

Figure 1:
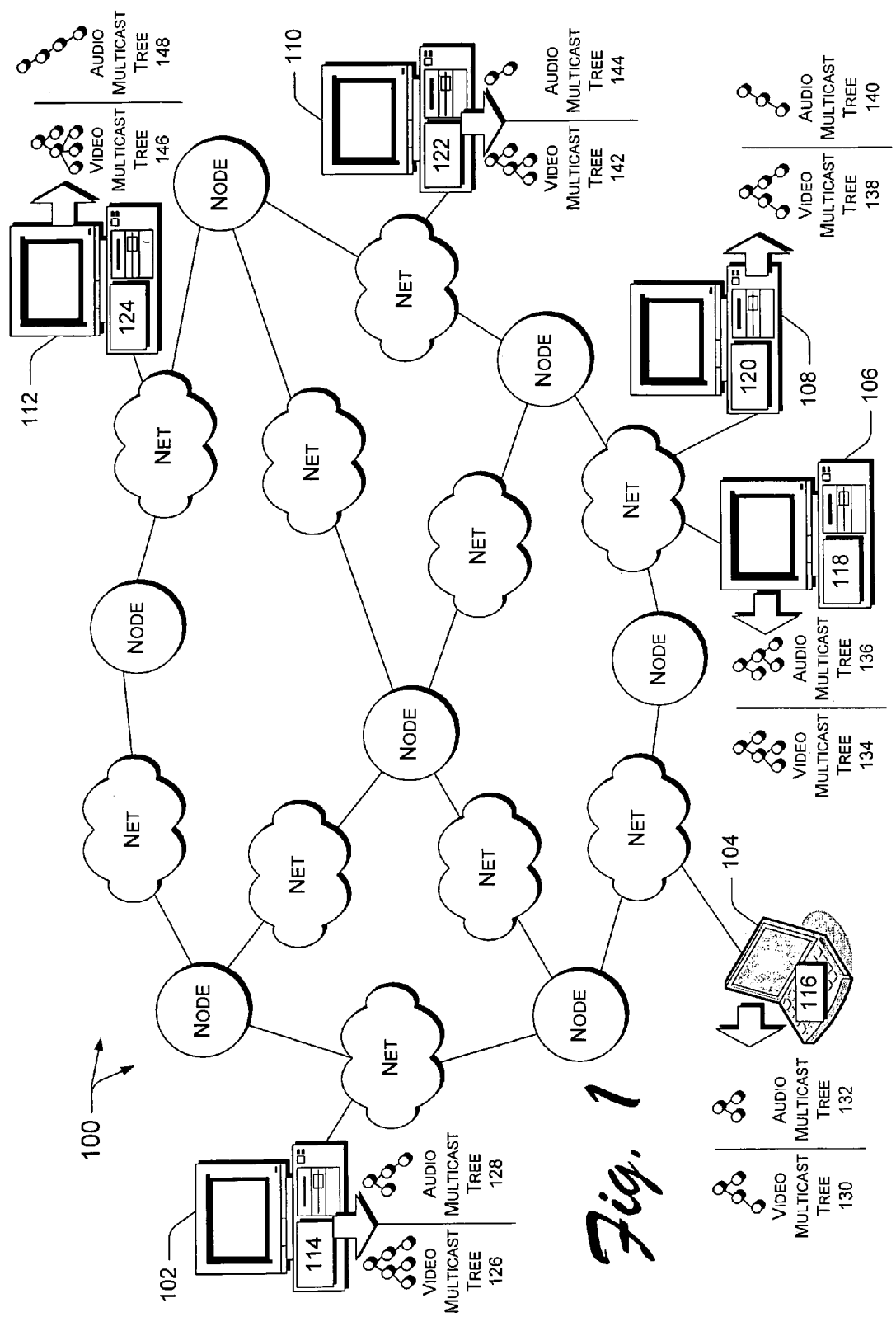
FIG. 1 is a diagram of an exemplary audio-video conferencing system that uses an exemplary application-level routing protocol.

FIG. 1 shows an exemplary videoconferencing system 100 in which the exemplary ALM routing protocol introduced above can be used. Multiple computing devices (i.e., 102, 104, 106, 108, 110, 112) participating in a videoconference are communicatively coupled with each other via the Internet or other network. Computing devices (e.g., 102) that are participating in a videoconference are variously referred to as "end systems," "participants," "members," "member nodes," "sources," "source nodes," etc. A computing device (e.g., 102) that is participating in (or coupled to participate in) a videoconference will be referred to herein as a "source," "member," or "member source," depending on the context.

In a typical implementation, each videoconference member (e.g., 102) is either coupled directly with the Internet or indirectly coupled to the Internet via LANs which are in turn connected to the Internet. Various network nodes, which can be routers, switches, etc., are also depicted in FIG. 1 to show the fabric from which multicast trees for routing videoconferencing data are constructed. Each member (e.g., 102) is also reckoned as a node in the videoconferencing system 100.

In the exemplary videoconferencing system 100, each member 102 that is participating in a videoconference (e.g., 102, 104, 106, 108, 110, 112) includes an exemplary conferencing engine (e.g., 114, 116, 118, 120, 122, and 124). For example, source 102 includes exemplary conferencing engine 114.

Each exemplary conferencing engine (114, 116, 118, 120, 122, 124) generates both a video ALM tree (respectively, 126, 130, 134, 138, 142, 146) and an audio ALM tree (respectively, 128, 132, 136, 140, 144, 148). For example, source 102, which includes exemplary conferencing engine 114, creates both a video ALM tree 126 and an audio ALM tree 128. Each exemplary conferencing engine (e.g., 114) dynamically recomputes its video ALM tree 126 and its audio ALM tree 128 in response to changing conditions on the network, changes within the videoconference, and/or changes in the multicast trees of neighboring members. In other words, each participant in a videoconference generates its own set of two ALM trees for audio and video, and all the multicast trees related to the entire videoconference are dynamically updated in response to departures from a stable state and in response to changes in each other (i.e., changes in the other multicast trees).

The exemplary ALM routing protocol thus uses multiple source-specific trees instead of using a single multiple spanning tree (MST) for multi-sender data delivery. By definition, an MST has optimal network resource usage, which is defined as $\Sigma_{i=1}^{L} d_i * s_i$ where L is the number of links in the multicast tree, $d_i$ is the delay of link i, and $s_i$ is the stress of link i. However, in a multiparty videoconference with N members, concentrating all the media traffic on N−1 edges brings these edges a heavy network load. The uplink bandwidth required for each node can be calculated as N(d−1)+1, where d is the out-bound degree of the node in the MST. It can be seen that for any inner node (d>1), the size of the required uplink bandwidth is on the order of O(N), where O represents the computational complexity.

The multiple source-specific trees of the exemplary ALM routing protocol, on the other hand, distribute the network load on a maximum of N(N−1)/2 links, thereby greatly reducing the stress on any single link. Although multiple overlay links may share the same bottleneck in the network layer, the exemplary ALM routing protocol is well-designed to avoid such situations.

Exemplary Engine

Figure 2:
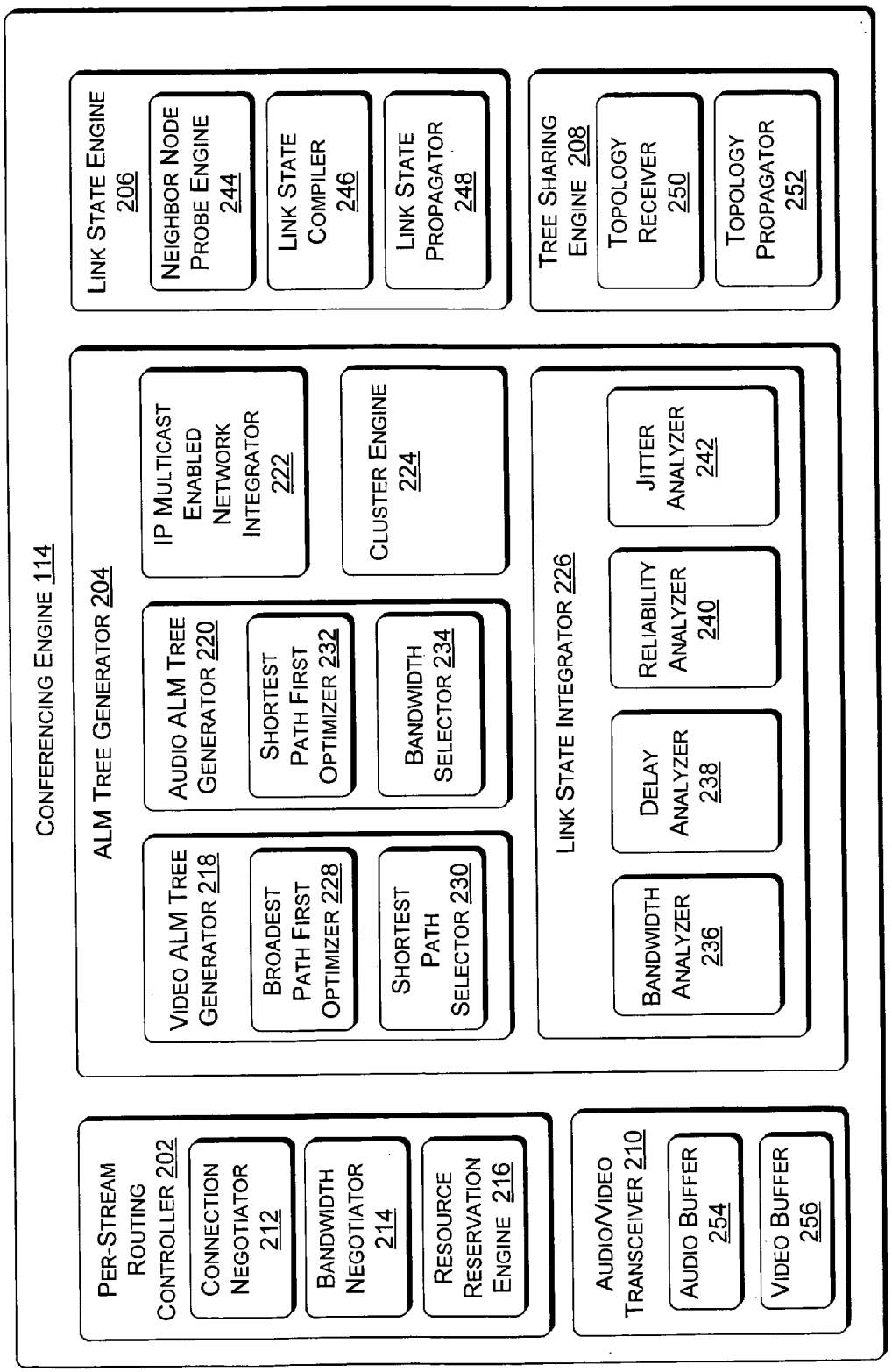
FIG. 2 is a block diagram of an exemplary ALM conferencing engine.

FIG. 2 shows the exemplary conferencing engine 114 of FIG. 1 in greater detail. The illustrated configuration of the exemplary conferencing engine 114 is meant to provide only one example arrangement for the sake of overview. Many other arrangements of the illustrated components, or similar components, are possible within the scope of the subject matter. Such an exemplary conferencing engine 114 can be executed in hardware, software, or combinations of hardware, software, firmware, etc.

In one implementation, the exemplary conferencing engine 114 includes a per-stream routing controller 202, an ALM tree generator 204, a link state engine 206, a tree sharing engine 208, and an audio/video transceiver 210.

The per-stream routing controller 202 may further include a connection negotiator 212, a bandwidth negotiator 214, and a resource reservation engine 216.

The ALM tree generator 204 recalculates and/or reconfigures the current audio and video ALM trees in response to input from the per-stream routing controller 202. The ALM tree generator 204 may further include a video ALM tree generator 218, an audio ALM tree generator 220, an IP multicast-enabled network integrator 222, a cluster engine 224, and a link state integrator 226. The video ALM tree generator 218 may further include a broadest-path-first (BPF) optimizer 228 and a shortest path selector 230. The audio ALM tree generator 220 may further include a shortest-path-first (SPF) optimizer 232 and a bandwidth selector 234. The link state integrator 226 may further include a bandwidth analyzer 236, a delay analyzer 238, a reliability analyzer 240, and a jitter analyzer 242.

For the remaining components, the link state engine 206 may further include a neighbor node probe engine 244, a link state compiler 246, and a link state propagator 248. The tree sharing engine may further include a topology receiver 250 and a topology propagator 252. The audio/video transceiver 210 may further include an audio buffer 254 and a video buffer 256.

In one implementation, which also uses techniques similar to link state routing on the Internet, the neighbor node probe engine 244 of each exemplary conferencing engine 114 periodically probes its neighbor sources and the link state compiler 246 collects this link state information. The link state propagator 248 of each member source (e.g., 102) then propagates the link state information to the other member sources (e.g., 104, 106, 108, 110, 112) so that each member source (e.g., 102) can re-compute its video and audio ALM trees based on complete status data for the videoconferencing system 100, including the underlying network. In distinction from link state routing, simply marking a link to be up or down is not enough in the exemplary ALM routing protocol. For example, in generating multicast trees, the link state integrator 226 has components that analyze multiple factors that go into the generation of a current multicast tree, such as the bandwidth analyzer 236, the delay analyzer 238, the reliability analyzer 240, and the jitter analyzer 242, etc.

Conventionally, although ALM protocols take both delay and bandwidth conditions into consideration, only the delay condition is preferentially considered in a conventional tree optimization, while bandwidth is merely looked on as a constraint. In contrast, the exemplary conferencing engine 114 considers both metrics as important for a videoconferencing application, where bandwidth is more critical to the delivery of video data. The exemplary conferencing engine 114 differentiates between audio and video data, and uses different optimization metrics in their multicast tree computation.

For audio data, the audio ALM tree generator 220 optimizes the end-to-end delay performance under a bandwidth constraint. In a preprocessing step, the bandwidth selector 234 removes links whose available bandwidth is less than the audio bit rate. Then, the shortest-path-first (SPF) optimizer 232 applies a shortest-path-first (SPF) routing algorithm to compute the audio ALM tree 128, which in one implementation is an extension to the original Dijkstra's algorithm.

For video data, to build a video ALM tree 126 for bandwidth intensive video data, the video ALM tree generator 218 takes the bandwidth condition as the primary optimization condition. In one implementation, the broadest-path-first (BPF) optimizer 228 may use the exemplary BPF algorithm, shown below in Table 2, which computes the broadest paths to all destinations from a given source (e.g., such as 102):

```
Dijkstra_BPF(G, s)
01         for each vertex u ∈ G.V( )
02             u.setbw(0)
03             u.setparent(NIL)
04         s.setbw(∞)
05         S ← Ø
06         Q ← G.V( )
07         while(!Q.IsEmpty( ))
08             u ← Q.extractMax( )
09             S ← S ∪ {u}
10             for each v ∈ u.adjacent( ) do
11                 Relax(u, v)
Relax(u, v)
           bw_uv = min(u.getbw( ),bw(u, v))
           if(v.getbw( )< bw_uv)
               v.setbw(bw_uv)
               v.setparent(u)
``` in one implementation, if two paths have a similar available bandwidth, the shortest path selector 230 may choose the shorter one, e.g., by using part of the above BPF algorithm shown in Table 2. Although there is a certain degree of a latency requirement on video data, using BPF routing for video results in better system performance than using SPF routing. The reasons for this result are many. For example, in most cases, sending data directly from end-to-end incurs less latency than relaying the data using one or more intermediate nodes. Therefore, a SPF algorithm always picks up the direct link from the source, when it exists. However, this strategy uses up the local bandwidth too aggressively. Thus, conventional techniques that use SPF for video data typically have to go through a complicated refinement process to balance bandwidth usage.

A broadest-path-first (BPF) optimizer 228 for creating a video ALM tree 126 is also superior to conventional techniques because queuing theory suggests that the variation in round trip time a varies proportionally to $1/(1-L)$, where L is the current network load. Injecting a bandwidth-intensive video stream into a broader path has less influence on the network load L, and therefore introduces less variation in transmission latency.

Then too, bandwidth and latency are not independent. A link with considerable bandwidth normally does not have very large transmission latency. In other words, although the latency is not an input to the exemplary BPF routing algorithm as shown in Table 2, it does affect the result in an implicit way.

On the other hand, the audio ALM tree generator 220 continues to use a shortest-path-first (SPF) optimizer 232, that is, may use a SPF algorithm to compute the audio ALM tree 128, for several reasons. First, the bit rate of an audio stream is relatively small, usually around 10 to 20 kilobits per second (Kbps). This bit rate has an influence on the network load that is almost negligible. Therefore, injecting an audio stream to even a narrow link will not typically cause a noticeable increase in latency variation.

While video data can enhance the user experience of remote conferencing, audio is a necessity for communication. When a conference member does not have enough bandwidth, it is possible to keep only the audio streams and turn off unnecessary videos. In such a case, transmitting an audio stream at the fastest speed is essential to the quality of two-way communication.

When a conference member requests both audio and video from a specific source (e.g., 102), the two streams—audio and video—need to be synchronized at the receiver's side. Transmitting audio in a faster channel can provide a benefit since the audio data can be saved in the audio buffer 254 in such a manner that a larger buffer can tolerate more variation and more out-of-order delivered packets.

Thus, the exemplary conferencing engine 114 uses a broadest-path-first (BPF) optimizer 228 for video ALM tree 126 production and a shortest-path-first (SPF) optimizer 232 for audio ALM tree 128 production—that is, two different algorithms for generating multicast trees for routing audio and video data. In one implementation, both exemplary video and exemplary audio routing algorithms are extensions to the original Dijkstra's algorithm. The exemplary extensions are for the purpose of making use of IP multicast as much as possible in order to further improve data delivery efficiency. IP multicast is the most efficient mechanism to enable one-to-many data delivery, since it ensures no duplicate packets on a physical link. However, some inherent problems have prevented IP multicast from being globally deployed. These problems include the complexity introduced at the infrastructure level, the vulnerability to flooding attacks, and poor scalability in an open Internet environment.

The exemplary ALM routing protocol herein is more versatile than IP multicast in that the exemplary ALM routing protocol can work independently of underlying hardware. This, however, does not prevent the exemplary conferencing engine 114 from making use of IP multicast, when available, in its exemplary ALM routing protocols. Though IP multicast has not yet been globally deployed, and may never be, it is often available in LANs.

Figure 3:
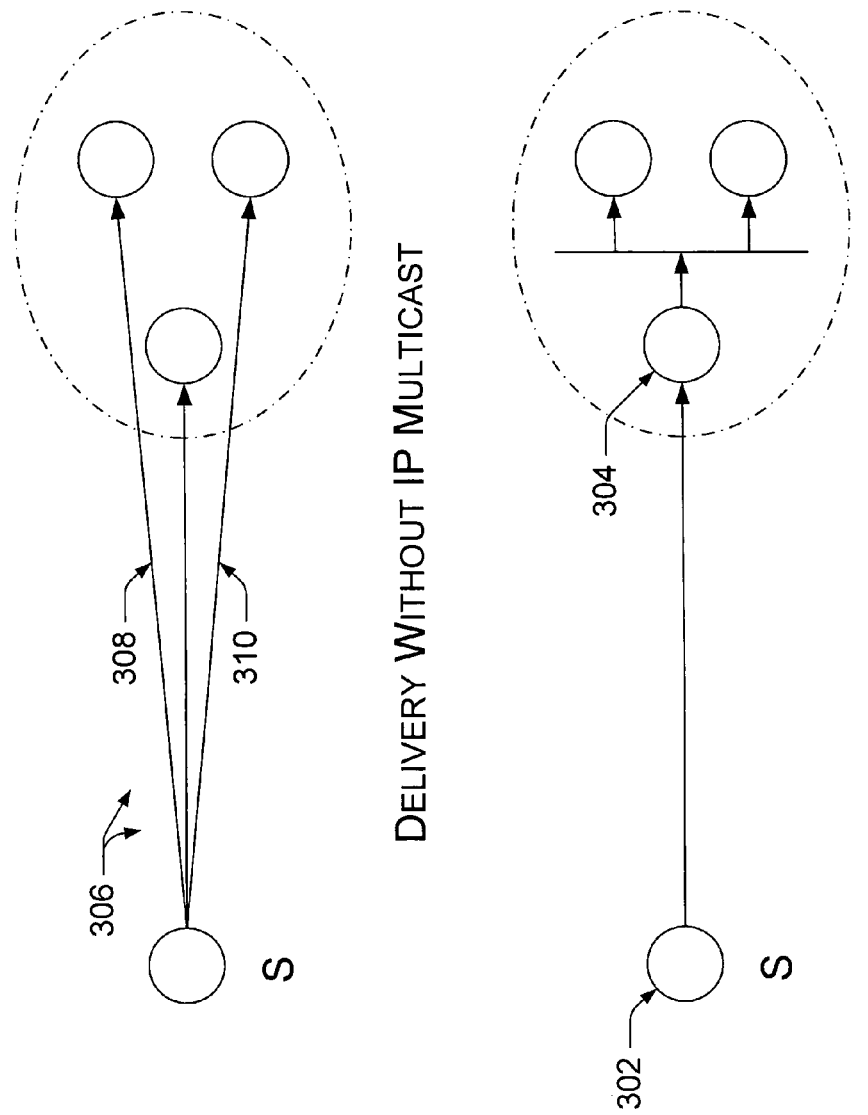
FIG. 3 is a diagram of exemplary IP multicast integration in the exemplary application-level routing protocol.

As shown in FIG. 3, in a multiparty videoconference, if two or more members from an IP multicast-enabled LAN are requesting the same data from a specific data source "s" 302, then s 302 only needs to send one copy of the data to one of the members 304, who can then relay the data to all the other members through IP multicast. Suppose the bandwidth of s 302 permits more than three upload links. Then in one implementation, the exemplary conferencing engine 114 can send data in multiple unicast 306 according to the original Dijkstra's algorithm. But if IP multicast is available, then the IP multicast-enabled network integrator 222 of the exemplary conferencing engine 114 can avoid two long transmission links (308, 310) by making use of IP multicast, if available, and using an IP multicast tree schema to send the data.

In order to generate the IP multicast tree schema, the IP multicast-enabled network integrator 222 makes an extension to the original Dijkstra's algorithm. One example of this extension will now be described. For the sake of simplicity, only an exemplary extension to for an SPF algorithm that can be used by the shortest-path-first (SPF) optimizer 232 is described. A similar extension can be applied, with only minor changes, to an exemplary BPF algorithm to be used by the broadest-path-first (BPF) optimizer 228, such as the exemplary BPF algorithm shown in Table 2.

The process that the IP multicast-enabled network integrator 222 and the cluster engine 224 implement to include IP multicast (when it is available) in the reckoning of current multicast trees, can be defined as follows.

First, given the parameters (V, E, C, δ, and s), (V, E) defines a directed graph where S∈V is the source node (e.g., 102). The term δ( ) defines a cost function, wherein each edge e=(u, v) in E has a non-negative cost δ(u, v). The cluster engine 224 finds C, a set of IP multicast-enabled LANs (or clusters). C={$c_i$} and $c_i$={$v_i$}, if u, v∈$c_i$, δ(u, v)=0. The IP multicast-enabled network integrator 222 finds the shortest path tree T rooted at s that satisfies for any cluster c∈C: if s∉c, then there is one and only one edge e=(u, v) in T where u∉c and v∈c; otherwise, there does not exist e=(u, v) in T where u∉c and v∈c.

Figure 4:
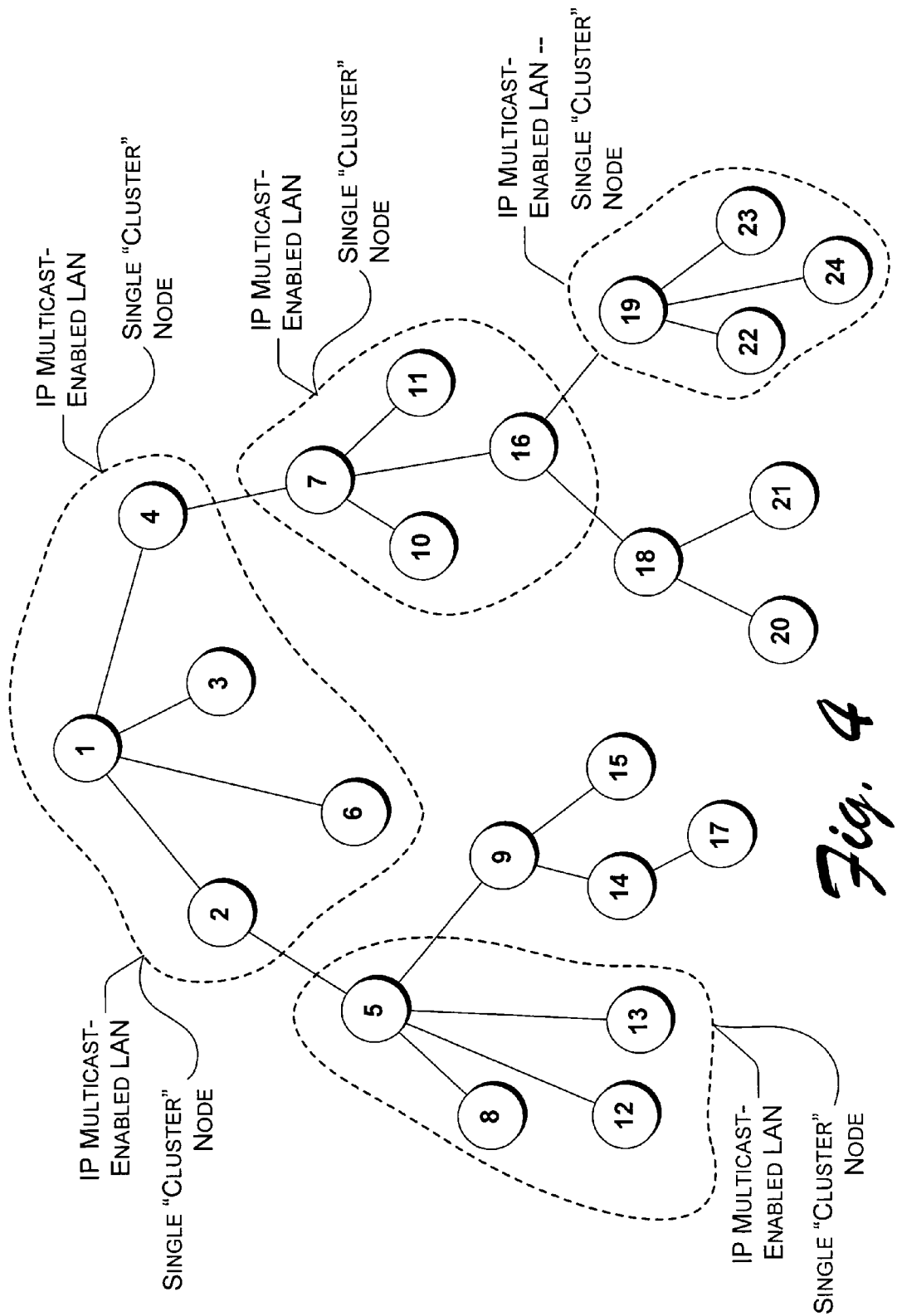
FIG. 4 is a diagram of exemplary node clustering for the exemplary IP multicast integration.

In one implementation, the IP multicast-enabled network integrator 222 implements the inclusion of IP multicast capability by a three-step process. First, as shown in FIG. 4, all the nodes in the same IP multicast-enabled LAN cluster are considered a single cluster node; then, the original Dijkstra's algorithm is applied to a graph that has the cluster nodes; then last, the cluster nodes are reversed into ordinary nodes and necessary edges are added to generate the multicast tree. This process implemented by the IP multicast-enabled network integrator 222 and cluster engine 224 is now described in greater detail.

Step 1 entails generating (V',E,δ'):
if v∈c, then v is replaced with c in V'.
the cost function is changed to:

$$\delta'(x, y) \begin{cases} \delta(x, y) & \text{if } x, y \in V \\ \min_{u \in x} \delta(u, y) & \text{if } x \in C, y \in V \\ \min_{v \in y} \delta(x, v) & \text{if } x \in V, y \in C \\ \min_{u \in x, v \in y} \delta(u, v) & \text{if } x \in C, y \in C \end{cases}$$

Step 2 entails using the original Dijkstra's algorithm to compute the shortest path tree T' on (V',E,δ').

Step 3 entails generating T from T', starting from T=φ. For each edge (x,y)∈T':
if x∈V & y∈V, then T←T∪(x,y)
if x∈C & y∈V, then T←T∪(u,y), where u=r|$\min_{r \in x}$ δ(r,y)
if x∈V & y∈C, then T←T∪(x,v)∪(v,$w_i$), where v=t|$\min_{r \in y}$∈(x,t),$w_i$∈y if x∈C & y∈C, then T←T∪(u,v)∪(v,$w_i$), where (u,v)=(r,t)|$\min_{r \in x, t \in y}$δ(r,t),$w_i$∈y Table 3 shows one implementation of the exemplary ALM routing just described that uses clusters and integrates ability to use IP multicast, where enabled, into the calculation of multicast trees:

TABLE 3

| pseudo code representing exemplary routing with clusters |
|---|
| Dijkstra(G, s) |
| 01    for each vertex u ∈ G.V( ) |
| 02        u.setd(∞) |
| 03        u.setparent(NIL) |
| 04    s.setd(0) |
| 05    S ←∅ |
| 06    Q ←G.V( ) |
| 07    while(!Q.IsEmpty( )) |
| 08        u ←Q.extract.Min( ) |
| 09        S ←S ∪ u.cluster( ) |
| 10        for each w ∈ u.cluster( ) |
| 11            for each v ∈ w.adjacent( ) do |
| 12                if(v.getd( )> w.getd( )+dist(w, v)) |
| 13                    v.setd(w.getd( )+dist(w, v)) |
| 14                    v.setparent(u) |
| 15                for each x ∈ v.cluster( ) |
| 16                    if(x.getd( )> v.getd( )) |
| 17                        x.setd(v.getd( )) |
| 18                        x.setparent(v) |

The exemplary conferencing engine 114 also uses an exemplary control protocol. The per-stream routing controller 202 uses a distributed schema for computing and maintaining the ALM trees. Thus, each member source (e.g., 102) is responsible for computing the audio and video ALM trees (126, 128) for its own streams. The tree sharing engine 208 includes the topology propagator 252 introduced above to forward updated topologies of the trees to the topology receivers 250 of all current subscribers so that they can route the streams in the same direction.

Conventional ALM protocols typically do not have any control over available bandwidth usage. Instead, they rely on the underlying network to provide best-effort delivery. But the bandwidth between two participating member sources (e.g., 102, 104) in the exemplary videoconferencing system 100 can be roughly measured, and the bandwidth negotiator 214 provides a mechanism for multiple senders to avoid overloading the transmission links.

In one implementation, the bandwidth negotiator 214 uses a technique similar to those of circuit-switch communication networks. Circuit-switch and packet-switch are two basic types of communication networks. The canonical examples of these two types are the public switched telephone network (PSTN) and the Internet. Packet-switching allows multiple communications to share the network resource, so that the cost is kept low in comparison to the circuit-switch networks. On the other hand, packet-switching cannot provide a guaranteed data path as circuit-switching does. The connection negotiator 212 and the resource reservation engine 216 negotiate dedicated data delivery paths analogous to those created in circuit-switch networks, and then the audio and video ALM trees (126, 128) are created or recalculated to designate these carefully calculated data routes. Thus, the exemplary conferencing engine 114 uses the per-stream routing controller 202 in the generation and dynamic recalculation of video and audio ALM trees (126, 128) instead of per-packet routing as is used on the Internet.

Exemplary Method

Figure 5:
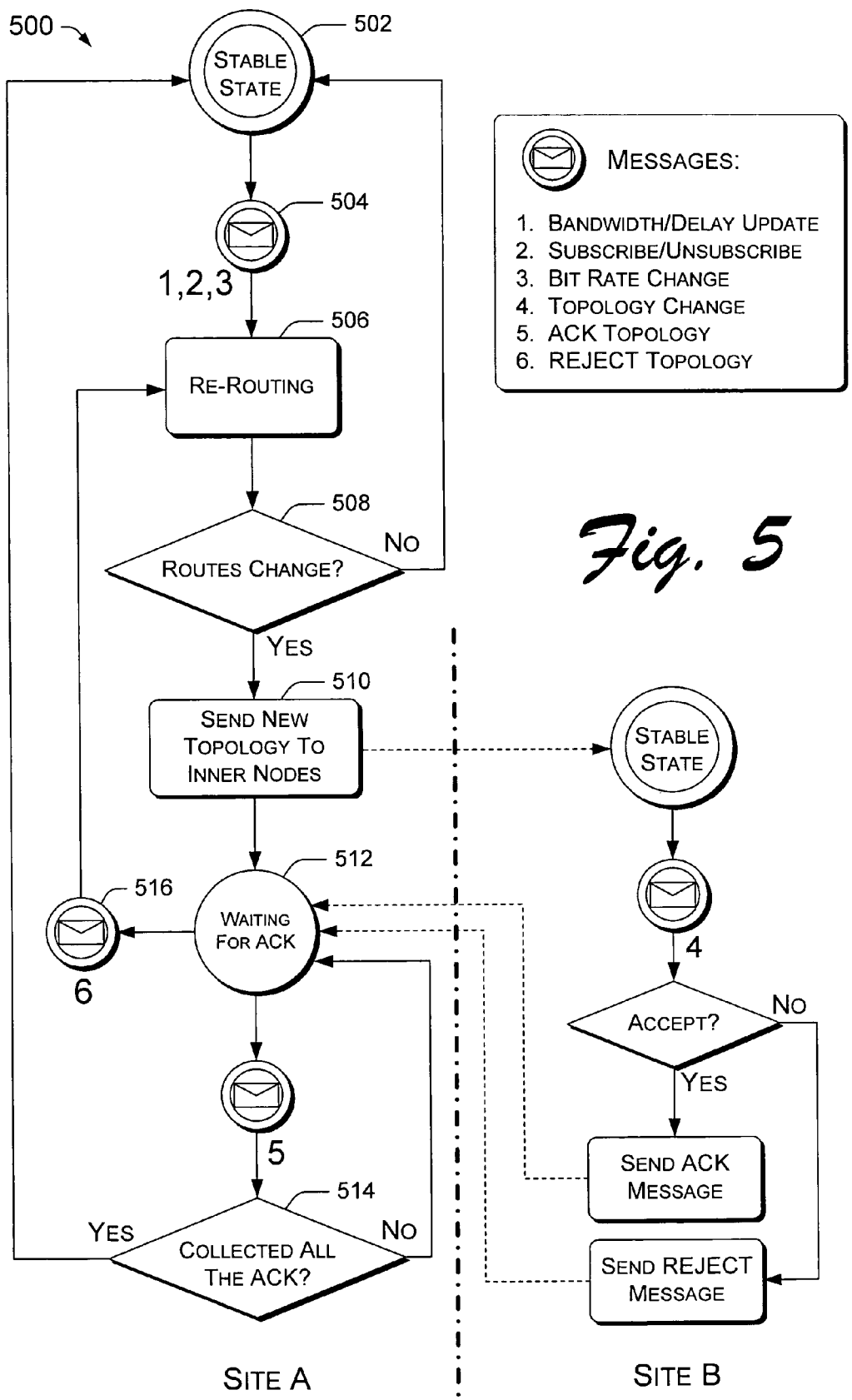
FIG. 5 is a flow diagram of an exemplary per-stream routing control process.

FIG. 5 shows an exemplary per-stream control process 500 that can be used, for example, by the exemplary conferencing engine 114. In the flow diagram, the operations are summarized in individual blocks and icons. Parts of the exemplary process 500 may be performed by hardware, software, or combinations of both, for example, by components of the exemplary conferencing engine 114.

At block 502, the videoconference data routing process is in a stable state, in which each participating member "source" of a videoconference sends audio and video data to a subset of the members of the videoconference, using both an exemplary audio ALM tree that has been optimized according to an exemplary shortest-path-first routing protocol and an exemplary video ALM tree that has been optimized according to an exemplary broadest-path-first routing protocol.

At block 504, one of the following events may happen: a bandwidth and/or delay change may be detected or received as an update message; one of the sources (i.e., a videoconference user) may subscribe or unsubscribe from a stream; or bit rate change may be received as an update message.

In one implementation, each source, such as "Site A," receives periodic link status updates. Every 10 seconds, for example, each member source may broadcast its updated link status to all the other member sources. Upon receiving such an update message, each source evaluates and may recompute the ALM trees for their streams. In most cases, the ALM trees do not change if there is not any abrupt change in the underlying network.

If one or more of the member sources unsubscribe or resubscribe to a stream during the videoconference (e.g., a member source unsubscribes to an audio stream by pressing a mute button) the originating member node, e.g., Site A, receives a subscription/unsubscription request. A member source can subscribe or unsubscribe to any stream at any time during the videoconference. This change in subscription status affects data delivery routes in that non-subscribers are trimmed from multicast trees if they are leaf nodes, that is, member sources that are not relied upon to propagate streams to other member sources.

If a user at one of the member sources (or a feedback module) decides to change the quality of the stream, then Site A receives a bit rate change message. In other words, a member can change the quality of the member's own media streams during the videoconference. For example, a user may wish to reduce video bit rate in order to upload photos to an e-album during the videoconference. A feedback module may also request that the stream bit rate be reduced if the current network resources cannot serve all subscribing member sources at a certain quality of service (QoS) level.

At block 506, if any of these events listed above for block 504 occur, then the source (Site A in this example) performs a re-routing evaluation, that is, decides whether the audio and/or video ALM trees should be recomputed to maintain or increase efficiency of data delivery.

At block 508, if the data delivery routes change due to recomputation of the ALM tree(s), e.g., using an ALM tree generator 204, then at block 510 the new topology is forwarded to the inner nodes of the multicast tree.

At block 512, if the newly computed ALM tree resulted in different routes from the previous tree (and thus the member source, Site A, sent the new topology to all the participating member sources as at block 510) then the member source, Site A, waits for an acknowledgement from the relay nodes, if any.

At block 514, after all relay nodes have accepted the new topology, the data source goes back to the stable state at block 502.

At block 516, however, if any relay nodes reject the new topology, which may happen if another data source has just occupied the resource, then the data source (Site A) recomputes the multicast trees again, achieving new routes using the most up-to-date link state information and attempts sending the new topology to the other member sources again, as at block 510.

CONCLUSION

The subject matter described above can be implemented in hardware, software, firmware, etc., or combination thereof. In certain implementations, the subject matter may be described in the general context of computer-executable instructions, such as program modules, being executed by a computing device or communications device. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The foregoing discussion describes exemplary application-level routing protocols for multiparty audio-video conferencing. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method implemented on an end system computing device of a multiparty videoconference, the method comprising:
negotiating dedicated fixed routes, by an end system computing device of each member of the multiparty videoconference, to other members of the multiparty videoconference;
creating an audio ALM (application-level multicast) tree for each member of a multiparty videoconference for routing videoconference audio data to other members of the multiparty videoconference using associated ones of the dedicated fixed routes;
creating a video ALM tree for each member of the multiparty videoconference for routing videoconference video data associated with the videoconference audio data to the other members using associated ones of the dedicated fixed routes, the audio ALM tree and the video ALM tree being generated by the end system computing device of each member of the multiparty videoconference to designate the dedicated fixed routes for per-stream routing of each data stream between the end system computing devices of members of the multiparty videoconference, wherein the creating the audio and video ALM trees further includes generating each of the audio ALM trees according to shortest-path-first (SPF) selection of data delivery routes and creating each of the video ALM trees according to broadest-path-first (BPF) selection of data delivery routes; and
broadcasting a link status message for each member of the multiparty videoconference to other members of the multiparty videoconference.

2. The method as recited in claim 1, wherein the creating each of the audio ALM trees further comprises eliminating data links that have available bandwidth that is less than the audio bit rate.

3. The method as recited in claim 1, wherein the creating each of the video ALM trees further comprises selecting data links that have the shortest path when choosing between data links that have equivalent bandwidth.

4. The method as recited in claim 1, further comprising buffering the videoconference audio data received via the shortest-path-first (SPF) delivery routes to synchronize with the videoconference video data received via the broadest-path-first (BPF) delivery routes.

5. The method as recited in claim 1, further comprising recalculating the audio ALM tree or the video ALM in response to the broadcasted link status message comprising a change in a link state parameter of at least part of a network hosting the videoconference.

6. The method as recited in claim 5, wherein the change in the link state parameter comprises one of a change in bandwidth, a change in latency, a change in member subscription to a data stream, a change in bit rate, a change in reliability, or a change in jitter.

7. The method as recited in claim 1, further comprising recalculating the audio ALM tree or the video ALM tree in response to receiving a recalculated topology of an audio ALM tree or a recalculated topology of a video ALM tree from one of the other members.

8. The method as recited in claim 1, further comprising recalculating the audio ALM tree and the video ALM tree in response to a change in a link state parameter of at least part of the network hosting the videoconference.

9. The method as recited in claim 1, further comprising propagating a recalculated audio ALM tree topology or a recalculated video ALM tree topology to the other members of the multiparty videoconference.

10. The method as recited in claim 1, further comprising probing link state characteristics of neighboring members of the multiparty videoconference to update the audio ALM tree or the video ALM tree.

11. The method as recited in claim 1, further comprising creating the audio ALM tree and the video ALM tree to use multiple unicast to route the audio and the video data to the other members of the multiparty videoconference.

12. The method as recited in claim 1, further comprising:
finding, by the end system computing device of the member of the multiparty videoconference, where Internet Protocol (IP) multicast is enabled in part of a network for hosting the multiparty videoconference;
generating, by the end system computing device of the member of the multiparty videoconference, the audio ALM tree and the video ALM tree, based in part on where the IP multicast is found to be enabled, to route the audio data and the video data using:
the IP multicast in the part of the network hosting the multiparty videoconference; and
multiple unicast in parts of the network where the IP multicast is not enabled.

13. The method as recited in claim 12, wherein the generating the audio ALM tree and the video ALM tree that utilize IP multicast further includes:
defining member nodes within each IP multicast-enabled local area network (LAN) segment of the network to be a single cluster node;
applying a Dijkstra's algorithm to a graph of the network, wherein the graph includes member nodes and each single cluster node;
reversing each single cluster node back into member nodes; and
adding edges between the member nodes to complete the audio ALM tree and the video ALM tree.

14. A conferencing engine, comprising:
memory;
at least one processor communicatively coupled to the memory;
an application-level per-stream routing controller, implemented by an end system computing device of a member of a multiparty videoconference, that negotiates fixed dedicated data delivery routes to other members of the multiparty videoconference;
a first application-level multicast (ALM) tree associated with the application-level per-stream routing controller, to distribute video data to members of a videoconference, wherein a broadest-path-first selection process selects a subset of the fixed dedicated data delivery routes to construct the first ALM tree; and
a second ALM tree associated with the application-level per-stream routing controller, to distribute audio data associated with the video data to the members of the videoconference, wherein a shortest-path-first selection process selects a subset of the fixed dedicated data delivery routes to construct the second ALM tree.

15. The conferencing engine as recited in claim 14, further comprising an IP multicast enabled network integrator associated with the application-level per-stream routing controller to facilitate finding where IP multicast is enabled for one or more segments of a network hosting the videoconference, the first ALM tree and the second ALM tree being constructed based on the finding to distribute data via the IP multicast in parts of the network in which the IP multicast is enabled and to distribute data via multiple unicast in parts of the network in which the IP multicast is not enabled.

16. The conferencing engine as recited in claim 14, further comprising:
a ALM tree generator to facilitate recalculating of the first ALM tree and the second ALM tree in response to a change in a link state parameter or in response to a change in at least one ALM tree of another member of the video conference, wherein the link state parameter comprises one of a change in the bandwidth, a change in the latency, a change in the member subscription to a data stream, a change in the bit rate, a change in the reliability, or a change in the jitter, the application-level per-stream routing controller negotiating one or more fixed dedicated data delivery routes used in the recalculating.

17. A computer-readable storage device having instructions stored thereon that, when executed by at least one processor, perform operations comprising:
implementing application-level per-stream routing control of audio data and video data of a videoconference for a participating member of the videoconference that is coupled to a network hosting the videoconference;
dynamically updating a first application-level multicast (ALM) tree for the participating member of the videoconference according to shortest-path-first selection of data delivery paths, wherein the first ALM tree is used for sending audio data from the participating member to other participating members of the videoconference;
dynamically updating a second ALM tree for the participating member of the videoconference according to broadest-path-first selection of data delivery paths, wherein the second ALM tree is used for sending video data associated with the audio data from the participating member to the other participating members of the videoconference;
dynamically finding, by an end system computing device of the participating member of the videoconference, segments of the network in which Internet Protocol (IP) multicast is enabled;
dynamically updating, by the end system computing device of the participating member of the videoconference, the first ALM tree and the second ALM tree, based in part on where the IP multicast is found to be enabled, to utilize IP multicast in the segments of the network in which IP multicast is enabled; and
broadcasting a link status message to the other members of the videoconference.

* * * * *